United States Patent [19]

Abdulally

[11] Patent Number: 4,947,804
[45] Date of Patent: Aug. 14, 1990

[54] FLUIDIZED BED STEAM GENERATION SYSTEM AND METHOD HAVING AN EXTERNAL HEAT EXCHANGER

[75] Inventor: Iqbal F. Abdulally, Randolph, N.J.

[73] Assignee: Foster Wheeler Energy Corporation, Clinton, N.J.

[21] Appl. No.: 386,181

[22] Filed: Jul. 28, 1989

[51] Int. Cl.⁵ ............................................. F22B 1/00
[52] U.S. Cl. ................................... 122/4 D; 110/246; 110/216
[58] Field of Search ............... 122/4 D; 110/245, 215, 110/216; 431/170, 7

[56] References Cited

U.S. PATENT DOCUMENTS

| | | | |
|---|---|---|---|
| 4,565,139 | 1/1986 | Sage et al. | 122/4 D |
| 4,682,567 | 7/1987 | Garcia-Mallol | 122/4 D |
| 4,699,068 | 10/1987 | Engstrom et al. | 122/4 D |
| 4,732,113 | 3/1988 | Engstrom | 110/245 |
| 4,755,134 | 7/1988 | Engstrom et al. | 110/245 |
| 4,809,623 | 3/1989 | Garcia-Mallol | 122/4 D |
| 4,813,380 | 3/1989 | Engstrom | 122/4 D |
| 4,854,249 | 8/1989 | Khinkis et al. | 122/4 D |
| 4,856,460 | 3/1989 | Wied et al. | 122/4 D |

Primary Examiner—Henry C. Yuen
Attorney, Agent, or Firm—Marvin A. Naigur; Warren B. Kice

[57] ABSTRACT

A fluidized bed steam generation system and method in which an external heat exchanger is located adjacent a furnace section. A mixture of flue gases and entrained particulate materials from a fluidized bed in the furnace section are separated and the flue gases are passed to a heat recovery section and the separated particulate material back to the fluidized bed in the furnace section. Particulate material from the fluidized bed in the furnace section is circulated through the external heat exchanger to add heat to water, steam or a steam/water mixture before the material is passed back to the furnace section. Water is passed through the furnace section, the heat recovery section, and the external heat exchanger to convert the water to steam.

11 Claims, 1 Drawing Sheet

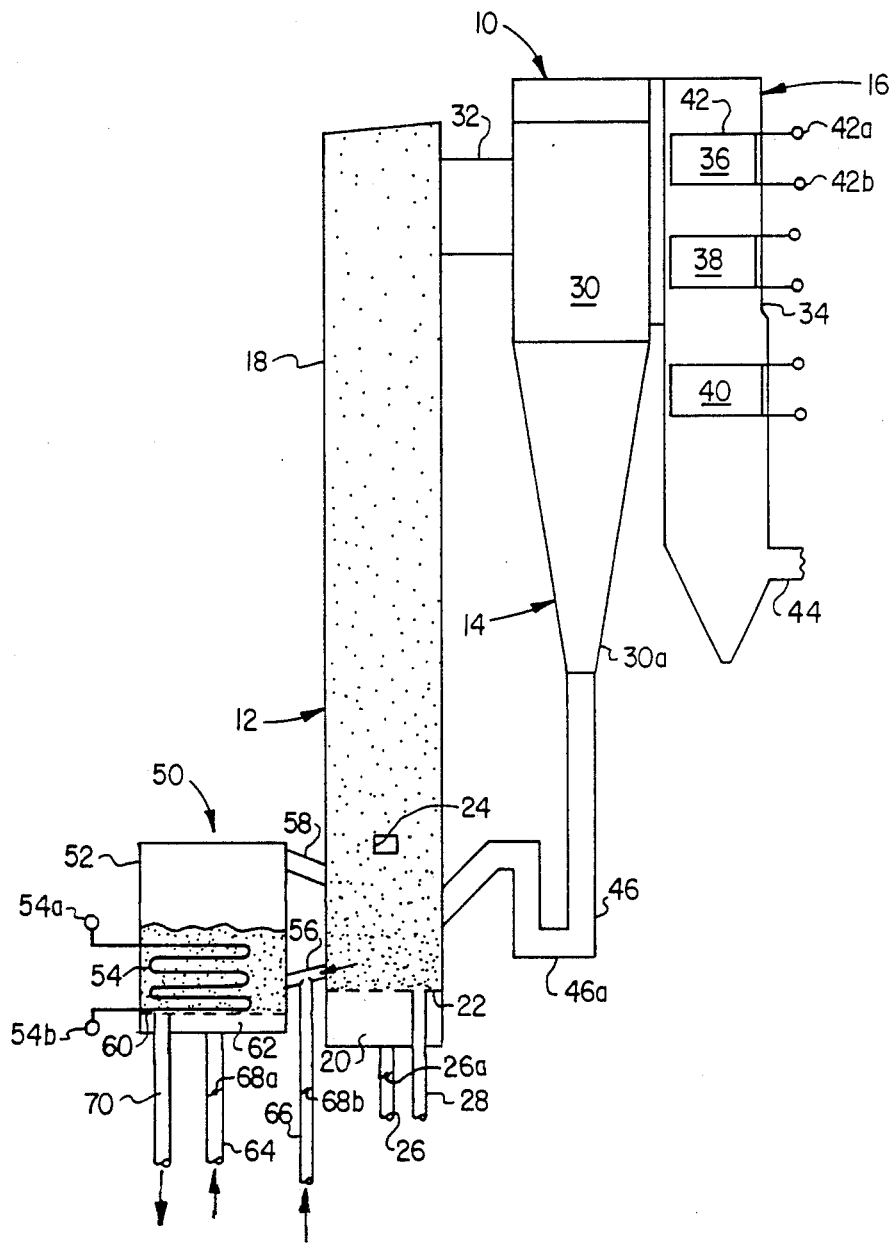

FLUIDIZED BED STEAM GENERATION SYSTEM AND METHOD HAVING AN EXTERNAL HEAT EXCHANGER

BACKGROUND OF THE INVENTION

This invention relates to a fluidized bed steam generation system and a method of operating same and, more particularly, to such a system and method in which an external heat exchanger is provided adjacent the furnace section of the system.

Fluidized bed steam generation systems are well known. In these arrangements, air is passed through a bed of particulate material, including a fossil fuel such as coal and an adsorbent for the sulfur generated as a result of combustion of the coal, to fluidize the bed and to promote the combustion of the fuel at a relatively low temperature. Water is passed in a heat exchange relationship to the fluidized bed to generate steam. The combustion system includes a separator which separates the entrained particulate solids from the gases from the fluidized bed in the furnace section and recycles them into the bed. This results in an attractive combination of high combustion efficiency, high sulfur adsorption, low nitrogen oxides emissions and fuel flexibility.

The most typical fluidized bed utilized in the furnace section of these type systems is commonly referred to as a "bubbling" fluidized bed in which the bed of particulate material has a relatively high density and a well defined, or discrete, upper surface. Other types of fluidized beds utilize a "circulating" fluidized bed. According to this technique, the fluidized bed density may be below that of a typical bubbling fluidized bed, the air velocity is equal to or greater than that of a bubbling bed, and the flue gases passing through the bed entrain a substantial amount of the fine particulate solids to the extent that they are substantially saturated therewith.

Also, circulating fluidized beds are characterized by relatively high solids recycling which makes it insensitive to fuel heat release patterns, thus minimizing temperature variations, and therefore, stabilizing the emissions at a low level. The high solids recycling improves the efficiency of the mechanical device used to separate the gas from the solids for solids recycle, and the resulting increase in sulfur adsorbent and fuel residence times reduces the adsorbent and fuel consumption.

Often, in circulating fluidized bed combustion systems an external heat exchanger is located in the hot cyclone primary solids stream for the purpose of removing heat from the recycled solids in order to obtain a relatively high heat transfer rate.

However, in these types of arrangements, there is a design requirement at all loads to have a high enough rate of solids recycle at high temperature in order to satisfy superheater and/or boiling duty demand, on the external heat exchange, which is always not possible to achieve.

SUMMARY OF THE INVENTION

It is therefore an object of the present invention to provide a fluidized bed combustion system and method which overcomes the aforementioned disadvantage.

It is a further object of the present invention to provide a system and method of the above type which satisfies superheater and/or boiling duty demands.

It is further object of the present invention to provide a system and method of the above type in which a fluidized bed external heat exchanger is provided adjacent the furnace section that receives hot particulate material from the fluidized bed and extracts heat from the material before the material is returned to the bed.

It is a further object of the present invention to provide a system and method of the above type in which the heat exchange surface of the external heat exchanger is sized according to duty requirements.

It is a further object of the present invention to provide a system and method of the above type in which the duty of the external heat exchanger is varied by varying its superficial fluidizing velocity.

Toward the fulfillment of these and other objects, the system of the present invention includes a fluidized bed heat exchanger located adjacent the furnace section of the system. The flue gases and entrained particulate materials from the fluidized bed in the furnace of the steam generating section are separated and the flue gases are passed to the heat recovery area and the separated particulate materials are recycled back to the furnace section. The external heat exchanger receives solids from the furnace bed which are fluidized and heat exchange surfaces are provided in the external heat exchanger for extracting heat from the fluidized particles. The solids in the external heat exchanger are then returned to the fluidized bed in the furnace section.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing which is a schematic representation depicting the system of the present invention.

DESCRIPTION OF THE PREFERRED EMBODIMENTS

Referring specifically to FIG. 1 of the drawings, the reference numeral 10 refers, in general, to the fluidized bed steam generation system of the present invention which includes a furnace section 12, a separating section 14, and a heat recovery area 16. The furnace section 12 includes an upright enclosure 18 and an plenum 20 disposed at the lower end portion of the enclosure for receiving a gas, such as air, from an external source. An air distributor, or grate, 22 is provided at the interface between the lower end of the enclosure 18 and the air plenum 20 for allowing the pressurized air from the plenum to pass upwardly through the enclosure 18.

Particulate material is supported on the air distributor 22, extends for the entire height of the enclosure 18 and has a density that decreases with height. One or more inlets, such as an inlet 24, are provided through the walls of the enclosure 18 for introducing a particulate material into the bed. An air conduit 26 is connected between a source of pressurized air (not shown) and the plenum 20 for introducing the air into the plenum under control of a damper 26a located in the plenum. The air from the plenum 20 fluidizes the particulate material in the enclosure 18 and, according to a preferred embodiment, the velocity of the air is of a magnitude to create a circulating fluidized bed as described above. A drain pipe 28 registers with an opening in the air distributor 22 and/or the walls of the enclosure 18 for discharging spent particulate material from the enclosure. The particulate material can include coal and relatively fine particles of an adsorbent material, such as limestone, for absorbing the sulfur generated during the combustion of the coal, in a known manner.

It is understood that the walls of the enclosure 18 include a plurality of water tubes disposed in a vertically extending relationship and that flow circuitry (not shown) is provided to pass water through the tubes to convert the water to steam. Since the construction of the walls of the enclosure 18 is conventional, the walls will not be described in any further detail.

The separating section 14 includes one or more cyclone separators 30 provided adjacent the enclosure 10 and connected thereto by ducts 32 which extend from openings formed in the upper portion of the rear wall of the enclosure 18 to an inlet opening formed in the upper portion of the separator 30. The separator 30 receives the flue gases and entrained particulate material from the fluidized bed in the enclosure 18 and operates in a conventional manner to disengage the particulate material from the flue gases due to the centrifugal forces created in the separator. The separated flue gases rise in the separator 30 and pass into and through the heat recovery area 16.

The heat recovery area 16 includes an enclosure 34 housing superheater 36, a reheater 38 and an economizer 40, all of which are formed by a plurality of heat exchange tubes 42 extending in the path of the gases that pass through the enclosure 34. It is understood that the tubes 42 forming the superheater 36, the reheater 38 and the economizer 40 all are formed into bundles connected between an inlet header 44a and an outlet header 44b which, in turn, are connected to additional fluid flow circuitry (not shown) extending from the tubes forming the walls of the furnace section 12 to receive heated water or vapor for further heating. After passing through the superheater 36, the reheater 38, and the economizer 40, the gases exit the enclosure 34 through an outlet 44 formed in the rear wall thereof.

The separated solids from the separator 30 pass into a hopper 30a connected to the lower end of the separator and then into a dipleg 46 connected to the outlet of the hopper. The dipleg 46 extends through a rear wall of the enclosure 18 for discharging the separated solids back to the fluidized bed. The dipleg 46 has a U-shaped portion 46a for preventing the backflow of solids and/or gases directly from the furnace section 12 to the separator 30.

An external heat exchanger 50 is provided adjacent the front wall of the enclosure 18 and includes a vessel, or housing 52 having a bundle of heat exchange tubes 54 extending therein. The housing 52 is formed from either water wall tubes on a refractory lined metal enclosure. The tubes 54 extend between an inlet header 54a and an outlet header 54b which, in turn, are connected to the aforementioned fluid flow circuitry in a manner to be described.

An inlet conduit 56 extends from the wall of the enclosure 18 to the lower portion of the housing 52 for transferring solid particles from the fluidized bed in the enclosure 18 to the housing 52. An outlet conduit 58 extends from the upper portion of the housing 52 to any of the walls of the enclosure 18 for returning the solid particles to the enclosure 18.

An air distributor 60 extends horizontally in the lower portion of the housing 52 to define an air plenum 62. Two conduits 64 and 66 receive gas, such as air, from an external source and communicate with the plenum 62 and the inlet conduit 56, respectively. This external source could be flue gases from a location downstream of the furnace.

Control dampers 68a and 68b are disposed in the ducts 64 and 66, respectively, to control the flow of air into the air plenum 62 and into the inlet pipe 56, respectively. A drain pipe 70 extends from the distributor 60 to remove coarse materials from the housing 52.

Hot particulate material can thus be continuously fed into the housing 52 via the conduit 56 and is fluidized by the air from the plenum 62 passing through the distributor 60. Water is passed through the tubes 54 to remove heat from the particulate material and the fluidizing air entrains the relatively fine particles and carries them upwardly in the housing 52 before they exit the housing and pass, via the outlet conduit 58 back into the enclosure 18 for fixing with the particles in the enclosure.

In operation, particulate fuel material from the inlet 24 is introduced into the enclosure 18 and adsorbent material can also be introduced in a similar manner, as needed. Pressurized air from an external source passes into and through the conduit 27, the air plenum 20, through the air distributor 22 and into the particulate material in the enclosure 18 to fluidize the material.

A lightoff burner (not shown), or the like, is disposed in the duct leading to the enclosure 18 and is fired to ignite the particulate fuel material. When the temperature of the material reaches an acceptably high level, additional fuel from the inlet 24 is discharged into the enclosure 18.

The material in the enclosure 18 is self combusted by the heat in the furnace section 12 and the mixture of air and gaseous products of combustion (hereinafter referred to as "flue gases") passes upwardly through the enclosure 18 and entrain, or elutriate, the particulate material in the enclosure. The velocity of the air introduced into the plenum 20, via the conduit 26 passes through the air distributor 22 and into the interior of the enclosure 18 controlled by adjustment of the damper 26a in accordance with the size of the particulate material in the enclosure 18 so that a circulating fluidized bed is formed, i.e. the particulate material is fluidized to an extent that substantial entrainment or elutriation of the particulate material in the bed is achieved. Thus the flue gases passing into the upper portion of the enclosure 18 are substantially saturated with the particulate material. The saturated flue gases pass to the upper portion of the enclosure 18 and exit through the duct 32 and pass into the cyclone separator 30. In the separator 30, the solid particulate material is separated from the flue gases and the former passes through the hopper 30 and passes, via the dipleg 46 back into the enclosure 18 where it mixes with the particulate material in the furnace section 12. The cleaned flue gases from the separator 30 pass upwardly and exit to the heat recovery area 16 for passage through the enclosure 34 and across the superheater 36, the reheater 38 and the economizer 40, before exiting through the outlet 44 to external equipment.

The control damper 68b is opened as desired to introduce air into the conduit 56 to promote the flow of particulate material from the enclosure 18 to the enclosure 52. Additional air, under the control of the damper 68a, is introduced into the plenum 62 which passes upwardly through the air distributor 60 and fluidizes the particulate material in housing 52. The velocity of the air and therefore the degree of flow of material into the housing 52 and the degree of fluidization and the resultant height of the material in the housing are respectively controlled as needed by varying the position of the dampers 68a and 68b.

The particulate material builds up in the housing 52 to a level at least sufficient to cover the bundle of tubes 54, and a portion of the particulate material is entrained by the fluidizing air and exits, via the conduit 58 and is introduced back into the enclosure 18.

Water is passed through the tubes forming the walls of the enclosure 18, the heat exchange tubes 42 forming the superheater 36, the reheater 38 and the economizer 40 and the heat exchange tubes 54 in the external heat exchanger 50 to extract heat from the particulate material in the enclosure 18 and the heat exchanger 50 and from the flue gases in the heat recovery area 16, to progressively convert the water to steam.

The amount of heat added to the water or steam passing through the tubes 54 of the heat exchanger 50 can be controlled by controlling the fraction of the total material flow that passes through the housing 52 which, in turn, can be controlled by varying the fluidizing velocity of the air by the damper 64a of the air inlet conduit 64. The headers 54a and 54b of the heat exchange tubes 54 can be connected in the flow circuit in a manner to supplement the heat added to the water or steam in the heat recovery area. For example, the outlet of the superheater 38 could be connected to the inlet header 54a of the heat exchange tubes 54 so that the demands on the superheater would be satisfied.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluidized bed steam generation system including a furnace section, a fluidized bed of particulate material including fuel formed in said furnace section, a separating section for receiving a mixture of entrained particulate material and flue gases from the combustion of said fuel from the fluidized bed in said furnace section and separating said entrained particulate material from said flue gases, a heat recovery section for receiving said separated flue gases, means for passing said separated particulate material from said separating section back into the fluidized bed in said furnace section, an external heat exchanger disposed adjacent said furnace section housing, first conduit means connecting said furnace section to said external heat exchanger for passing particulate material from said furnace section to said external heat exchanger, second conduit means connecting said external heat exchanger to said furnace section for permitting said material to flow from said external heat exchanger back to said furnace section, and means for passing water in a heat exchange relation to the particulate material in said furnace section and in said external heat exchanger, and to the separated flue gasses in said heat recovery section for adding heat to said water and converting it to steam.

2. The system of claim 1 further comprising fluid flow circuit means for connecting said external heat exchanger to said heat recovery section.

3. The system of claim 1 wherein said water passing means comprises a plurality of water tubes forming at least a portion of the walls of said furnace section.

4. The system of claim 1 wherein said external heat exchanger comprises an enclosure, and means for distributing gas through said particulate material in said enclosure to fluidize said particulate material.

5. The system of claim 4 wherein said water passing means comprises a plurality of tubes disposed in said enclosure.

6. The heat exchanger of claim 1 further comprising means for introducing gas to said first conduit means for promoting the flow of particulate material from said furnace section to said external heat exchanger.

7. A method of generating steam comprising the steps of fluidizing a bed of particulate material including fuel in a furnace section, the flue gases from the combustion of said fuel from the fluidized bed entraining said particulate material, separating said entrained particulate material from said flue gases, passing said said separated flue gases through a heat recovery section, passing said separated particulate material back into the fluidized bed in said furnace section, connecting said furnace section to a external heat exchanger for passing particulate material from said furnace section to said external heat exchanger, connecting said external heat exchanger to said furnace section for permitting said particulate material to flow from said external heat exchanger back to said furnace section, passing water in a heat exchange relation to the particulate material in said furnace section and in said external heat exchanger and to the separated flue gasses in said heat recovery section for adding heat to said water and converting it to steam.

8. The method of claim 7 further comprising the step of connecting said external heat exchanger to said heat recovery section.

9. The method of claim 7 wherein said step of passing water includes passing water through at least a portion of the walls of said furnace section.

10. The method of claim 7 comprising the steps of distributing gas through the particulate material in said external heat exchanger.

11. The method of claim 7 further comprising the step of introducing gas into the flow of particulate material from said furnace section into said external heat exchanger to promote said flow.

* * * * *

UNITED STATES PATENT AND TRADEMARK OFFICE
CERTIFICATE OF CORRECTION

PATENT NO. : 4,947,804

DATED : AUGUST 14, 1990

INVENTOR(S) : IQBAL F. ABDULALLY

It is certified that error appears in the above-identified patent and that said Letters Patent is hereby corrected as shown below: COLUMN 6;

CLAIM 7, line 15, before "passing", insert --and--.

Col. 2, line 41, delete "Fig. 1 of the drawings" and insert --the drawing--.

Col. 2, line 61, delete "plenum" and insert --conduit--.

Col. 3, line 32, change "44a" to --42a--.

Col. 3, line 33, change "44b" to --42b--.

Col. 4, line 6, delete "pipe" and insert --conduit--.

Col. 4, line 22, delete "27, the" and insert --26, and the--.

Col. 4, line 36, delete "velocity of the".

Col. 4, line 39, before "controlled" insert --,the velocity of the air being--

Signed and Sealed this

Twenty-sixth Day of May, 1992

Attest:

DOUGLAS B. COMER

*Attesting Officer*   *Acting Commissioner of Patents and Trademarks*